J. DUPLESSIE.
MEASURING DEVICE.
APPLICATION FILED NOV. 15, 1919.
1,382,717.
Patented June 28, 1921.
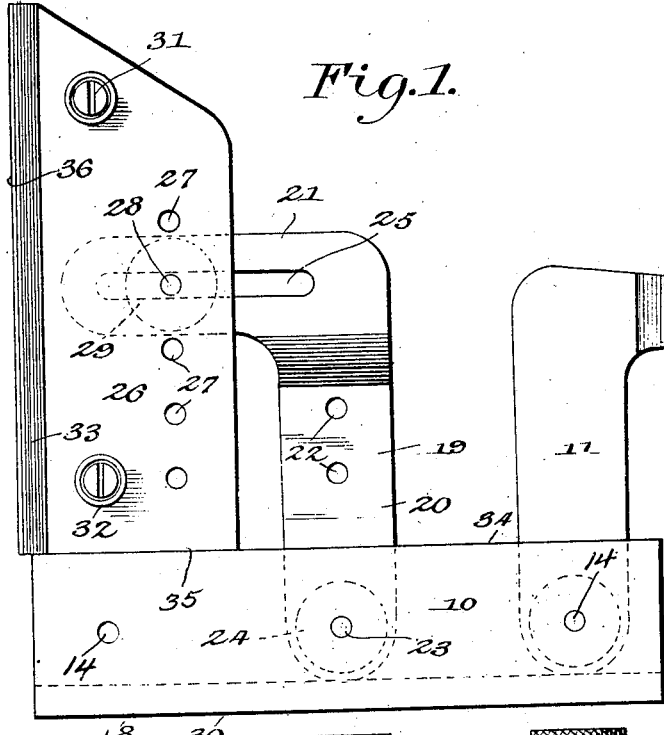
Fig.1.
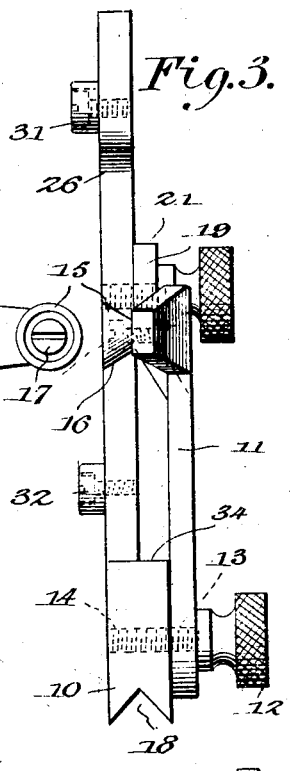
Fig.3.
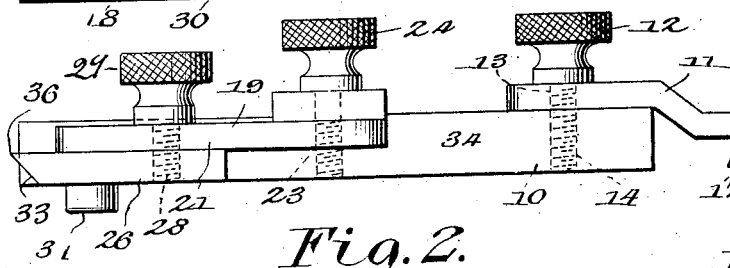
Fig.2.
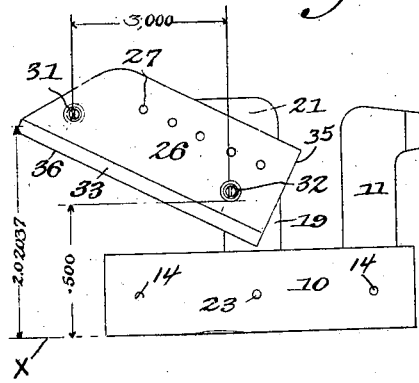
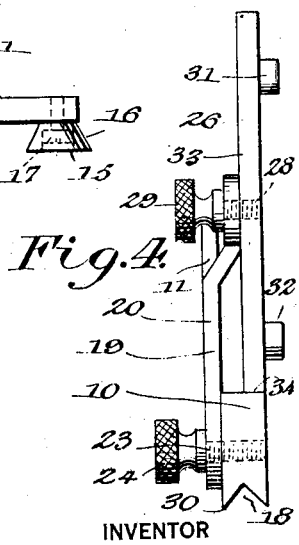
Fig.4.
Fig.5.
INVENTOR
Joseph Duplessie
BY
Victor J. Evans.
ATTORNEY

UNITED STATES PATENT OFFICE.

JOSEPH DUPLESSIE, OF PROVIDENCE, RHODE ISLAND.

MEASURING DEVICE.

1,382,717.   Specification of Letters Patent.   Patented June 28, 1921.

Application filed November 15, 1919. Serial No. 338,162.

*To all whom it may concern:*

Be it known that I, JOSEPH DUPLESSIE, a citizen of the United States, residing at Providence, in the county of Providence and State of Rhode Island, have invented new and useful Improvements in Measuring Devices, of which the following is a specification.

This invention relates to measuring devices and more particularly, it consists of a device for determining and testing angles and for gaging radii.

Some of the objects of the invention are: to produce a device which embodies the use of a sine bar and radii gages in conjunction with a single supporting base member; to produce a device with which to accomplish hitherto unachieved advantageous results, in that the sine bar thereof, has a wider range of adjustment and in that the sine bar is of novel formation; to produce a device of the character herein disclosed, with which to effectually obtain different and desired results hitherto accomplished by separate tools. With these and other objects in view the invention resides in the particular provision and combination of parts described more fully in the following specification and illustrated in the accompanying drawings in which:

Figure 1 is a side elevation of the complete device.

Fig. 2 is a plain view thereof.

Figs. 3 and 4 are end elevations of opposite ends of the device.

Fig. 5 is a diagrammatic view, illustrating the procedure of ascertaining the angle of the sine bar in a given case.

Referring now to the drawing it will be seen, that the device comprises a supporting base member 10 to which is pivoted a bracket 11. A threaded bolt 12, in assembling the bracket 11 with the base 10 extends through an aperture 13 in one end of the bracket 11 and threads in a threaded aperture 14 in the base member 10, there being a plurality of such threaded apertures 14, in the base member 10. The free end of the bracket 11 is adapted to carry a radius gage 15. The said gage 15 is beveled as at 16 and is secured to the free end of the bracket 11 by a screw 17. It is to be understood, that the radius gage 15 shown in the drawing is for gaging a particular radius and is only one of a number of similar gages to be used for gaging and testing many radii. The bottom face of the base member 10 is grooved as at 18, particularly adapting the device as a radius gage, in that the base member 10 may be properly seated upon a shaft or spindle which carries the work, the concaved, circular or rounded formation of whose parts are to be gaged or tested.

In order that the device may be used for determining or testing angles, the base member 10 carries a bracket 19. In this particular instance the bracket is of L shape to provide portions 20 and 21. The portion 20 of the bracket is provided with apertures 22 any one of which may receive the plain portion of a threaded bolt 23 so that the bracket as assembled with the base member 10, will have pivotal movement with relation thereto. The bolt 23 is provided with a head 24 to securely hold the bracket 19 in different positions of adjustment with relation to the base member 10. The portion 21 of the bracket 19 is offset with respect to the portion 20 and it is slotted as at 25. A sine bar 26 is carried by the portion 21 of the bracket 19. The sine bar is provided with a plurality of screw threaded apertures 27 any one of which may receive the threaded portion of a bolt 28 which extends through the slot 25, the bolt being provided with a head 29 which serves to hold the sine bar 26 clamped in different positions of adjustment with respect to the bracket 19 and obviously with respect to the bottom face 30 of the base member 10. The sine bar is provided with sine buttons 31 and 32 which are of prime importance for ascertaining the degree of angle to be obtained for carrying out a piece of work. One side edge of the sine bar 26 is beveled as at 33. The beveled feature of the sine bar is highly desirable, in that it will not shut out light while testing finished surfaces of work, nor will it obscure any mark that is being worked by as a guide for carrying out a piece of work.

For setting the sine bar and for determining the degree of angle at which the sine bar is disposed the following procedure is followed:—

The bolt 28 or both the bolt 28 and the bolt 23 may be loosened so that the bracket 19 as well as the sine bar 26 may be moved to bring the sine bar to approximately the desired angle. The sine bar 26 and bracket 19 are then temporarily clamped in their new positions. Now, for instance, were we to obtain an angle for the beveled edge of the sine bar 26 of 30° 27', it would be found then, by using "measuring blocks" or a "height gage" that the distance between the bottom face of the sine button 32 and a line X coincident with the plane of the face 30 would be .500, and the distance of the bottom face of the sine button 31 to the line X would be 2".02037; the distance between the centers of the sine buttons 31 and 32 as taken in Fig. 2 would be 3". To compute the angle the following formula is followed:

The sine of the angle 30° 27' is .50679" for 1". Now, since the distance between the buttons 31 and 32 is 3".50679" would be multiplied by 3, the multiplicand of which would be 1".52037 equal to the difference between the distances from the bottom faces of the sine buttons 31 and 32 to the line X thus $$1''.52037 + .500 = 2''.02037,$$

the distance the bottom face of sine button 31 must measure from line X, to have the edge 36 of the sine bar disposed at 30° 27'.

In order that the device may be used as a square base member 10, is so constructed that the upper face 34 thereof is in parallelism with the face 30. One end face 35 of the sine bar 26 is disposed precisely at a right angle to the beveled edge 36 of the sine bar. It will therefore be understood that when the edge 35 of the sine bar is confronted by the edge 34 of the base member 10, the sine bar will seat itself thereupon so that the edge 36 of the sine bar will be disposed at 90° with respect to the disposition of face 30 of the base member 10.

What is claimed as new is:—

1. In combination with a supporting base member having a groove in the bottom face thereof, a bracket pivoted to said base, a sine bar having sine buttons and a beveled edge pivoted to said bracket, means for holding the bracket in different positions relative to said base and means for holding the sine bar in different positions relative to the bracket.

2. In combination with a base member having a groove in one of its faces and two of its faces in parallelism, a bracket pivoted to said base, a sine bar having a beveled edge and one face thereof disposed at right angles to said beveled edge pivoted to said bracket, means for holding the bracket in different positions relative to said base and means for holding the sine bar in different positions relative to the bracket.

3. A device of the class described, including a base member, a slotted bracket pivoted to said base, a sine bar having a threaded aperture therein, a threaded pivot bolt adapted to extend through the slot in said bracket and to thread in the aperture in said sine bar, a clamp nut on said bolt, and sine buttons on said sine bar disposed to lie on opposite sides of said bolt.

4. A device of the class described, including a base member having threaded apertures therein, a bracket having differently disposed portions, an aperture in one of said portions and a slot in the other of said portions, a threaded pivot bolt adapted to extend through the aperture in one of said bracket portions and to thread in one of the threaded apertures in the base member, a clamp nut on said bolt, a sine bar having threaded apertures therein and sine buttons thereon, a pivot bolt adapted to extend through the slot in the other of said bracket portions and to thread in an aperture in the sine bar.

5. A device of the class described including a base member having a groove in the bottom face thereof, a bracket pivoted to said base, means for holding the bracket in different positions relative to said base, a sine bar having a beveled edge adjustably and pivotally mounted on said bracket, means for holding the sine bar in different positions relative to said bracket and sine buttons on said sine bar.

In testimony whereof I have affixed my signature.

JOSEPH DUPLESSIE.